United States Patent [19]

Drent

[11] Patent Number: 4,818,810

[45] Date of Patent: Apr. 4, 1989

[54] CATALYTIC PROCESS FOR THE PREPARATION OF POLYKETONES FROM CARBON MONOXIDE AND ETHYLENICALLY UNSATURATED HYDROCARBON

[75] Inventor: Eit Drent, Amsterdam, Netherlands

[73] Assignee: Shell Oil Company, Houston, Tex.

[21] Appl. No.: 782,787

[22] Filed: Oct. 2, 1985

[30] Foreign Application Priority Data

Oct. 5, 1984 [NL] Netherlands ........................ 8403035

[51] Int. Cl.$^4$ .............................................. C08G 67/02
[52] U.S. Cl. .................................... 528/392; 528/271; 568/342
[58] Field of Search ................. 528/392, 271; 568/342

[56] References Cited

U.S. PATENT DOCUMENTS

| | | | |
|---|---|---|---|
| 2,495,285 | 1/1950 | Hoehn | 260/28.5 |
| 2,495,286 | 1/1950 | Brubaker | 260/63 |
| 2,577,208 | 12/1951 | Reppe et al. | 260/406 |
| 2,641,590 | 6/1953 | Little, Jr. | 260/63 |
| 3,689,460 | 9/1972 | Nozaki | 260/63 CQ |
| 3,694,412 | 9/1972 | Nozaki | 260/63 CQ |
| 3,835,123 | 9/1974 | Nozaki | 260/94.9 B |
| 3,984,388 | 10/1976 | Shryne et al. | 260/63 CQ |
| 4,076,911 | 2/1978 | Fenton | 526/11.1 |

FOREIGN PATENT DOCUMENTS

| | | | |
|---|---|---|---|
| 834073 | 2/1970 | Canada | 44/19 |
| 121965 | 10/1984 | European Pat. Off. | |
| 2058074 | 3/1981 | United Kingdom | |

OTHER PUBLICATIONS

Organometallics, 1984, 3, 866–70.
Kirk–Othmer Encyclopedia of Chemical Technology, Second Edition 1967, 12, 132–3.
Encyclopedia of Polymer Science and Technology, 1968, 9, 397–402.
Organic Synthesis of Metal Carbonyls 1977, 2, 215–31.
Tetrahedron Lett. 1971, 26, 2409–12.
J. Polym. Sci. 1961, 55, 811–819.
J. Am. Chem. Soc. 1982, 104, 3520–2.

*Primary Examiner*—Harold D. Anderson

[57] ABSTRACT

A process for the preparation of polyketones is disclosed, the process being the polymerization of a mixture of CO and an alkenically unsaturated hydrocarbon in the presence of a Group-VIII-metal catalyst containing ligands, wherein hydrocarbon groups occur which are bound to an element from Group V a, characterized in that the catalyst used is a complex compound obtained by reaction of a palladium, cobalt or nickel compound, an anion of a carboxylic acid with a pKa lower than 2, and a bidentate ligand of the general formula $R^1R^2$—M—R—M—$R^3R^4$, wherein M represents phosphorus, arsenic or antimony, $R^1$, $R^2$, $R^3$ and $R^4$ are similar or dissimilar hydrocarbon groups, R is divalent organic bridging group not causing steric hindrance.

10 Claims, No Drawings

CATALYTIC PROCESS FOR THE PREPARATION OF POLYKETONES FROM CARBON MONOXIDE AND ETHYLENICALLY UNSATURATED HYDROCARBON

FIELD OF THE INVENTION

The invention relates to a process for the preparation of polyketones by polymerization of a mixture of CO and an alkenically unsaturated hydrocarbon in the presence of a Group-VIII-metal catalyst containing ligands, in which hydrocarbon groups occur which are bound to an element from Group Va.

BACKGROUND OF THE INVENTION

Interpolymers of carbon monoxide and olefins, such as ethylene, are known as polyketones and have been available in limited quantities for many years. A process for preparing high molecular weight alternating ethylene/CO copolymers is disclosed in U.S. Pat. Nos. 3,689,460 and 3,694,412. The catalysts disclosed therein are complexes of a palladium chloride or a $\pi$-allylpalladium chloride and two trihydrocarbylphosphine monodentate ligands, e.g. triphenylphosphine. However, polymer yields remain rather low, viz. below 35 g/g Pd/hr at a pressure of 70 bar. Another process for preparing polyketones is discussed by Sen and Lai in the article entitled "Novel Palladium(II)-Catalyzed Copolymerization of Carbon Monoxide with Olefins," *J. Am. Chem. Soc.* 1982, 104, 3520–3522.

Polyketones are also disclosed in U.S. Pat. No. 4,076,911 and in Kirk-Othmer Encyclopedia of Chemical Technology, Second Edition, Vol. 12, p. 132, 1967. Utilities noted there are the use alone or as additives in waxes and surface coating applications. The low molecular weight copolymers in particular are useful as intermediates and as a component in blends with other polymers (such as waxes). The higher molecular weight polymers will have utility as premium thermoplastics for uses in fibers, films, injection molding, compression molding or blow molding applications.

A new process for preparing polyketones in high yields is disclosed.

SUMMARY OF THE INVENTION

The invention relates to a process for the preparation of polyketones by polymerization of a mixture of CO and an alkenically unsaturated hydrocarbon in the presence of a Group-VIII-metal catalyst containing ligands, wherein hydrocarbon groups occur which are bound to an element from Group Va, characterized in that the catalyst used is a complex compound obtained by reaction of a palladium, cobalt or nickel compound, an anion of a carboxylic acid having a pKa lower than 2 and a bidentate ligand of the general formula $R^1R^2$—M—R—M—$R^3R^4$, wherein M represents phosphorus, arsenic or antimony, R represents a divalent organic bridging group having at least two carbon atoms in the bridge, none of these carbon atoms carrying substituents that may cause steric hindrance, $R^1$, $R^2$, $R^3$ and $R^4$ are identical or different hydrocarbon groups.

RELATED APPLICATION

A process for preparing polyketones is also described in copending application Ser. No. 596,788 filed Apr. 4, 1984, having a common assignee and the same inventor.

DETAILED DESCRIPTION OF THE INVENTION

Suitable carboxylic acids are trifluoroacetic acid, trichloroacetic acid, dichloroacetic acid and difluoroacetic acid, the first-named being preferred.

Preferably the anion of the acid with a pKa $<2$ is present in the reaction mixture in a quantity of 0.01–150, in particular 0.1–100 and most preferably 1–50, equivalents per gram atom Group VIII metal. It should be noted that said pKa is determined in an aqueous solution at 18° C.

The alkenically unsaturated hydrocarbon will generally be an alkene or a cycloalkene containing 2–30, preferably 2–12, carbon atoms. Examples of suitable alkenes include propene, 1-butene, 2-butene, isobutene, the isomeric pentenes, hexenes, octenes and dodecenes, cyclooctene and cyclododecene. Ethylene is the most preferred. Examples of other alkenically unsaturated compounds are styrene, α-methylstyrene, acrylic acid, methacrylic acid, alkyl esters of these acids and dialkenes in which the two unsaturated groups are not conjugated.

Of the palladium, nickel and cobalt compounds the first-named are the most peferred and it is with reference to palladium compounds that hereinafter the process according to the invention is described in more detail. However, this should not be taken as a restriction; the use of cobalt or nickel compounds remains possible.

Both homogeneous and heterogeneous palladium compounds can be used. Homogeneous systems are preferred. Suitable palladium compounds are salts of palladium with, for example, nitric acid, sulfuric acid or alkanoic acids containing not more than 12 carbon atoms. Salts of hydrohaloid acids can in principle be used as well, but they have the drawback that the halogen ion may produce corrosion. Palladium carboxylates are the preferred catalyst compounds, in particular palladium acetate. Further, palladium acetylacetonate can also be used. Palladium or carbon and palladium combined with an ion exchanger are examples of suitable heterogeneous palladium compounds.

The quantity of palladium compound is not critical. Preference is given to the use of quantities in the range of from $10^{-8}$ to $10^{-1}$ mol of palladium compound per mol of hydrocarbon to be polymerized. The molar ratio of alkenically unsaturated hydrocarbon to CO will generally range from 5:95 to 95:5, preferably from 1:5 to 5:1.

Where in the bidentate ligand it is said that substituents offering steric hindrance should be absent, this means that no substituents may be present that are able to hinder the formation of complex compounds having the general formula I

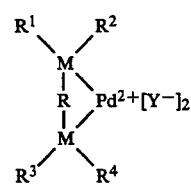

In that formula, Y represents a non-coordinating anion by which is meant that little or no covalent interaction takes place between Pd²⁺ and the anion, while Pd²⁺ can also be written as

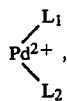

in which the ligands $L_1$ and $L_2$ are weakly coordinated solvent ligands, e.g. acetonitrile, methanol, acetone, or acetylacetone, or correspond with those employed in the palladium compounds described in the preceding paragraph.

In the bidentate ligand, M is preferably phosphorus. Hydrocarbon groups $R^1$, $R^2$, $R^3$ and $R^4$ will as a rule contain 2 to 18 carbon atoms, preferably 6 to 14 carbon atoms. Aryl groups are the most suitable, in particular the phenyl group. Preferred bridging groups —R— are those having the formula $(-CR^5R^6-)_n$ in which $R^5$ and $R^6$ are hydrogen atoms or hydrocarbon groups offering no steric hindrance and n is a number of at least two, most preferably 2, 3 or 4. Substituents $R^5$ and $R^6$ are preferably hydrogen atoms. The bridging groups R may also make part of cyclic structure, e.g. an aromatic or cycloaliphatic group, the carbon to carbon bond or bonds in the bridge may be saturated or unsaturated and in the bridge or in the cyclic or non-cyclic groups attached to the bridge one or more hetero atoms, e.g. sulfur, oxygen, iron or nitrogen, may have been substituted for carbon atoms, other than the two carbon atoms which must be present in the bridge linking both atoms M.

Examples of suitable bidentate ligands are
1,3-di(diphenylphosphine)propane,
1,4-di(diphenylphosphine)butane,
2,3-dimethyl-1,4-di(diphenylphosphine)butane,
1,5-di(methyl-phenyl-phosphine)pentane,
1,4-di(dicyclohexylphosphine)butane,
1,5-di(dinaphthylphosphine)pentane,
1,3-di(di-p-tolylphosphine)propane,
1,4-di(di-p-methoxyphenylphosphine)butane,
1,2-di(diphenylphosphine)ethene,
2,3-di(diphenylphosphine)butene-2,
1,3-di(diphenylphosphine)-2-oxpropane,
2-methyl,2-(methyldiphenylphosphine)-1,3-di(diphenylphosphine)propane,
O,O'-di(diphenylphosphine)biphenyl,
1,2-di(diphenylphosphine)benzene,
2,3-di(diphenylphosphine)naphthalene,
1,2-di(diphenylphosphine)cyclohexane,
2,2-dimethyl-4,5-di(diphenylphosphine)dioxolane and

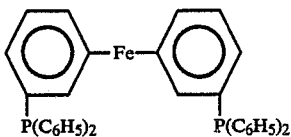

It is observed that compounds having a structure like 2-methyl,2-(methyldiphenylphosphine)-1,3-di(diphenylphosphine)propane, $CH_3-C-(CH_2-PC_6H_5)_2)_3$, although being trifunctional, are nevertheless considered bidentate ligands in the terms of this invention since only two of the three phosphorus atoms can coordinate with the palladium atom in complex (I).

The bidentate ligand can be employed in quantities, calculated on palladium compound, which may vary within wide limits, e.g. of from 0.1 to 10 mol per mol of palladium compound. Preferred quantities lie between 0.33 and 3 mol per mol. When cobalt or nickel compounds are used, this quantity will generally be chosen slightly higher, the preferred quantities then lying between 5 and 20 mol per mol of Group-VIII metal compound.

In addition to the bidentate ligand one or more monodentate ligands may also be used in the preparation of the catalysts in order to influence the molecular weight of the polymer to be prepared. Suitable monodentate ligands in particular are triarylphosphines, such as triphenylphosphine and trinaphthylphosphine. It is advisable to employ an excess of monodentate ligand in terms of Group-VIII-metal compound. Preferred quantities lie between 10:1 and 60:1, calculated on Group-VIII-metal compound.

The carbon monoxide can be used in the process according to the invention pure or diluted with an inert gas, such for instance as nitrogen, noble gases or carbon dioxide. Generally, the presence of more than 60% v of hydrogen is undesirable, since it may result in too severe a decrease of the desired polymer's molecular weight.

The polymerization according to the invention is preferably carried out at a temperature between 20° and 200° C., in particular between 50° and 150° C. The overall pressure preferably lies between 1 and 100, in particular 20 and 75, bar above atmospheric pressure.

The polymerization according to the invention can be carried out batchwise, continuously or semi-continuously by polymerization techniques in solution or suspension. Generally the use of a liquid diluent is desirable. Lower alcohols, ethers, glycols and glycol ethers have been found suitable. The polymers obtained are real copolymers which are generally characterized by the formula:

wherein m is a relatively low number, e.g. 1 to 6, A is the "monomer" unit which has been converted into a saturated hydrocarbon group and n is a number 2, 3 or more, for example more than 10, e.g. 3000, 6000.

In place of a single "monomer A" there may also occur two different "monomers", for example ethylene and styrene, ethylene and acrylic acid, ethylene and vinyl acetate, ethylene and 1-butene, propene and methylmethacrylate, 1-butene and acrylic acid, etc. As terminal groups in the polymer may be obtained for example the groups

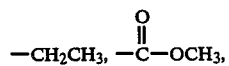

when using $CH_3OH$ as a diluent and

when using ethylene glycol;

when using water, and

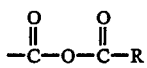

when using carboxylic acids. The activity of the catalysts may be so high that there is no need to remove catalyst residues from the copolymer obtained. Thus the necessity to purify the copolymer and/or to recover palladium ceases to exist, which represents a considerable economic advantage.

EXAMPLES (a) A magnet-driven autoclave of 250 ml capacity was charged with 50 ml methanol, 0.1 mmol palladium acetate, 0.15 mmol 1,3-di(diphenylphosphine)propane and 2 mmol trifluoroacetic acid. The autoclave was flushed with CO, filled with ethylene at a pressure of 20 bar and CO at a pressure of 20 bar, sealed and heated at 90° C. for a fixed period of time. After one hour the reaction was terminated by cooling and the polymer yield was determined and calculated as gram of polymer per gram of palladium per hour. A yield of 4000 g/g Pd/h was established.

(b) Further experiments were carried out in the way set out in (a) above, whenever different conditions were employed, this appears from Table I.

TABLE I

| Test | $P_{CO}$ bar | $P_C=$ bar | T °C. | Acid mmol | Polymer yield g/gPd/h |
|---|---|---|---|---|---|
| 2 | — | — | — | CCl$_3$COOH(2) | 200 |
| 3 | — | — | — | C$_6$F$_5$COOH(2) | 3000 |
| 4 | 30 | C$_3$=(8) | — | — | 400 |
| 5 | 40 | 1-C$_4$=(5) | — | — | 250 |
| 6 | 30 | — | 120 | O,O'—C$_6$H$_3$Cl$_2$COOH(20) | 750 |
| 7* | — | — | — | CH$_3$COOH(10) | — |

*for comparison, no polymer formed.

What is claimed is:

1. In a process for the preparation of a polyketone by contacting CO and an alkenically unsaturated hydrocarbon in the presence of a Group VIII metal catalyst, the improvement which comprises contacting the CO and the alkenically unsaturated hydrocarbon in the presence of a catalyst comprising a Group VIII metal complex containing bidentate ligands, the Group VIII metal selected from the group consisting of palladium, cobalt, and nickel, the ligands comprising hydrocarbon groups bonded to a Group Va element selected from the group consisting of phosphorus, arsenic, and antimony, wherein the catalyst is a complex compound that is obtained by reacting (1) a palladium, cobalt or nickel compound, (2) a bidentate ligand of the general formula

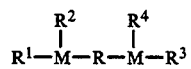

in which M is a group Va element selected from the group consisting of phosphorus, arsenic, and antimony, $R^1$, $R^2$, $R^3$, and $R^4$ are identical or different hydrocarbon groups, R represents a divalent organic bridging group having at least two carbon atoms in the bridge, wherein the carbon atoms of the bridging group R do not contain substituents that would sterically hinder formation of the complex compound, and (3) an anion of a carboxylic acid having a pKa of less than 2.

2. The process according to claim 1 wherein the carboxylic acid is selected from the group consisting of trichloroacetic acid, trifluoroacetic acid, dichloroacetic acid and difluoroacetic acid.

3. The process according to claim 2 wherein the carboxylic acid is trifluoroacetic acid.

4. The process according to claim 1 wherein the hydrocarbon groups $R^1$, $R^2$, $R^3$ and $R^4$ are aryl groups having 6–14 carbon atoms.

5. The process according to claim 4 wherein the aryl groups are phenyl groups.

6. The process according to claim 1 wherein the mol ratio of bidentate ligand to Group VIII metal compound selected from the group consisting of compounds of palladium, nickel and cobalt is 0.1:10 mol bidentate ligand per mol Group VIII metal compound.

7. The process according to claim 1 wherein (1) is a palladium compound.

8. The process according to claim 1 wherein the bidentate ligand is a phosphine.

9. The process according to claim 1 in which group —R— represents a group —(—CR$^5$R$^6$—)$_n$— in which n is a number of at least 2 and $R^5$ and $R^6$ are hydrogen atoms or hydrocarbon groups that will not sterically hinder formation of the complex compound.

10. The process according to claim 1 wherein the alkenically unsaturated hydrocarbon is ethylene.

* * * * *